(12) United States Patent
Viswanathan et al.

(10) Patent No.: US 10,089,761 B2
(45) Date of Patent: Oct. 2, 2018

(54) GRAPH PROCESSING USING A SHARED MEMORY

(71) Applicant: Hewlett Packard Enterprise Development LP, Houston, TX (US)

(72) Inventors: Krishnamurthy Viswanathan, Palo Alto, CA (US); Maria Gonzalez, Palo Alto, CA (US); Fei Chen, Palo Alto, CA (US); Hernan Laffitte, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/143,273

(22) Filed: Apr. 29, 2016

(65) Prior Publication Data

US 2017/0316591 A1    Nov. 2, 2017

(51) Int. Cl.
  *G06T 11/20*  (2006.01)
  *G06T 1/60*   (2006.01)
  *G06T 1/20*   (2006.01)
  *G06F 17/30*  (2006.01)

(52) U.S. Cl.
  CPC ...... *G06T 11/206* (2013.01); *G06F 17/30958* (2013.01); *G06T 1/20* (2013.01); *G06T 1/60* (2013.01)

(58) Field of Classification Search
  None
  See application file for complete search history.

(56) References Cited

U.S. PATENT DOCUMENTS

| 6,341,339 | B1 * | 1/2002 | Kontothanassis | G06F 9/544 |
| | | | | 707/999.201 |
| 7,561,584 | B1 | 7/2009 | Tourancheau et al. | |
| 7,844,959 | B2 * | 11/2010 | Isard | G06F 9/5066 |
| | | | | 712/7 |

(Continued)

FOREIGN PATENT DOCUMENTS

WO    WO-2009001368    12/2008

OTHER PUBLICATIONS

Xin, R., et al, "Graphx: A Resilient Distributed Graph System on Spark." First international Workshop on Graph Data Management Experiences and Systems. ACM, 2013, 6 pages.

(Continued)

*Primary Examiner* — Jason Pringle-Parker
(74) *Attorney, Agent, or Firm* — Brooks, Cameron & Huebsch, PLLC (57) ABSTRACT

Examples herein involve graph processing using a shared memory. An example method includes distributing vertices of a graph to a plurality of graph partition processors of a system, the graph partition processors to process non-overlapping sets of vertices of the graph; storing a master copy of a vertex state of the graph in a shared memory of the system; instructing the graph partition processors to iteratively process respective vertices of the graph partitions based on local copies of the state of the graph stored in respective local memories of the graph partition processors; and updating the master copy of the state of the graph in the shared memory based on the iterative processing of the partitions of the vertices by the graph partition processors until convergence of the graph.

12 Claims, 6 Drawing Sheets

(56) References Cited

U.S. PATENT DOCUMENTS

| | | | |
|---|---|---|---|
| 8,166,479 B2* | 4/2012 | Roberts | G06F 9/5066 |
| | | | 718/100 |
| 9,116,738 B2 | 8/2015 | Jacob et al. | |
| 9,372,928 B2* | 6/2016 | Zhou | G06Q 10/04 |
| 9,672,557 B2* | 6/2017 | Zhou | G06Q 30/0631 |
| 9,740,536 B2* | 8/2017 | van der Lugt | G06F 9/5083 |
| 2005/0278325 A1* | 12/2005 | Mihalcea | G06F 17/277 |
| 2007/0214115 A1* | 9/2007 | Liu | G06F 17/30864 |
| 2007/0239694 A1* | 10/2007 | Singh | G06F 17/30958 |
| 2014/0137129 A1* | 5/2014 | Jacob | G06F 9/46 |
| | | | 718/103 |
| 2014/0292781 A1* | 10/2014 | Flototto | G06T 1/20 |
| | | | 345/522 |
| 2015/0324410 A1 | 11/2015 | Glover | |
| 2016/0140152 A1* | 5/2016 | Sevenich | G06F 17/30386 |
| | | | 707/755 |
| 2016/0210238 A1* | 7/2016 | Frank | G06F 3/0604 |
| 2016/0292303 A1* | 10/2016 | Hong | G06F 17/30958 |
| 2017/0262209 A1* | 9/2017 | Wang | G06F 3/0629 |

OTHER PUBLICATIONS

Roy, A. et al.; "Chaos: Scale-out Graph Processing From Secondary Storage"; Oct. 4-7, 2015; 14 pages.
Barnawi, A., et al. "On Characterizing the Performance of Distributed Graph Computation Platforms." Performance Characterization and Benchmarking. Traditional to Big Data. Springer International Publishing, 2014. 29-43.

* cited by examiner

GRAPH PROCESSING USING A SHARED MEMORY

BACKGROUND

A graph is a representation of a set of data (e.g., Big Data). An example graph may include a plurality of vertices and edges connecting the plurality of edges. The graph may be processed by computing states of the vertices in accordance with characteristics of edges linked to the vertices and related vertices linked by the edges.

BRIEF DESCRIPTION OF THE DRAWINGS

Wherever possible; the same reference numbers will be used throughout the drawing(s) and accompanying written description to refer to the same or like parts.

DETAILED DESCRIPTION

Examples disclosed herein involve scalable processing of graphs that have been partitioned across a plurality of processing units (e.g., graph partition processors). In examples herein, graph partition processors process vertices of partitions of a graph, store local copies of the graph, and refer to a master copy of the graph in a shared memory to update the local copies and perform subsequent iterations of the corresponding vertices. Accordingly, using the scalable plurality of processing units in a multi-core environment with a shared memory architecture, examples herein enable for lock-free graph processing.

In graph processing; cluster-based computing environments include a relatively small number of processing units with relatively small amounts of memory in each cluster. In examples herein, a multi-core environment, in combination with a shared memory enable relatively short inter-process communication latency while holding increased amount of in-memory data structures that provide better data locality. Accordingly, examples herein enable increased speeds for graph processing via multiple graph processors (e.g., in a multi-core environment) that locally process vertices of partitions of the graph based on a stored local state of the entire graph (e.g., the state may include any/all mutable elements of the graph) and a shared memory (e.g., a fabric attached memory) that stores a master copy of the state of the entire graph (e.g.; the state may include any/all mutable elements of the graph), which is periodically (or aperiodically) updated by the multiple graph processors.

An example method includes distributing vertices of a graph to a plurality of graph partition processors of a system, the graph partition processors to process non-overlapping sets of vertices of the graph; storing a master copy of a vertex state of the graph in a shared memory of the system; instructing the graph partition processors to iteratively process respective vertices of the graph partitions based on local copies of the state of the graph stored in respective local memories of the graph partition processors; and updating the master copy of the vertex state of the graph in the shared memory based on the iterative processing of the partitions of the vertices by the graph partition processors until convergence of the graph In examples herein, graph processing may involve determining probabilities to infer characteristics of variables of the graph. In examples herein, graphs may be processed for any variety of applications, such as, ranking of web pages, label propagation in social networking, performing probabilistic inference on graphical models (e.g., Gibbs Sampling, belief propagation, etc.) for malware detection, click-through-rate prediction, etc. Accordingly, examples herein may apply to any type of graph processing. In examples herein, multiple iterations of processing the graph and/or partitions of the graph lead to convergence of the graph. Accordingly, examples herein may refer to a single iteration, however, multiple iterations may be used to determine the final result of processing the graph (i.e., convergence).

As used herein, graph processing (or processing a graph) involves processing vertices of a graph until all vertices (or a threshold percentage of the vertices) have been processed, which is known as convergence of the graph processing. Convergence occurs when all vertices (or a threshold percentage of the vertices) have been processed such that a particular characteristic of the vertices has reached a fixed point (or value), and, thus, does not change with subsequent iterations.

As used herein, asynchronous lock-free graph processing involves processing partitions of a graph separately from one another without utilizing a lock (i.e., without stopping a first set of vertices from being processed until a second set of vertices is processed). Accordingly, examples herein provide asynchronous lock-free processing of a graph across a plurality of partitions, which furthers and enables increased processing speeds.

Furthermore, in examples herein, graph data of a graph includes edge data and vertex data corresponding to the edges and vertices of the graph, respectively. The edge data includes edge information, such as message data, characteristic data, etc. The vertex data includes vertex information, such as vertex characteristics, connected vertices, vertex attributes, priority, etc.

Figure 1:
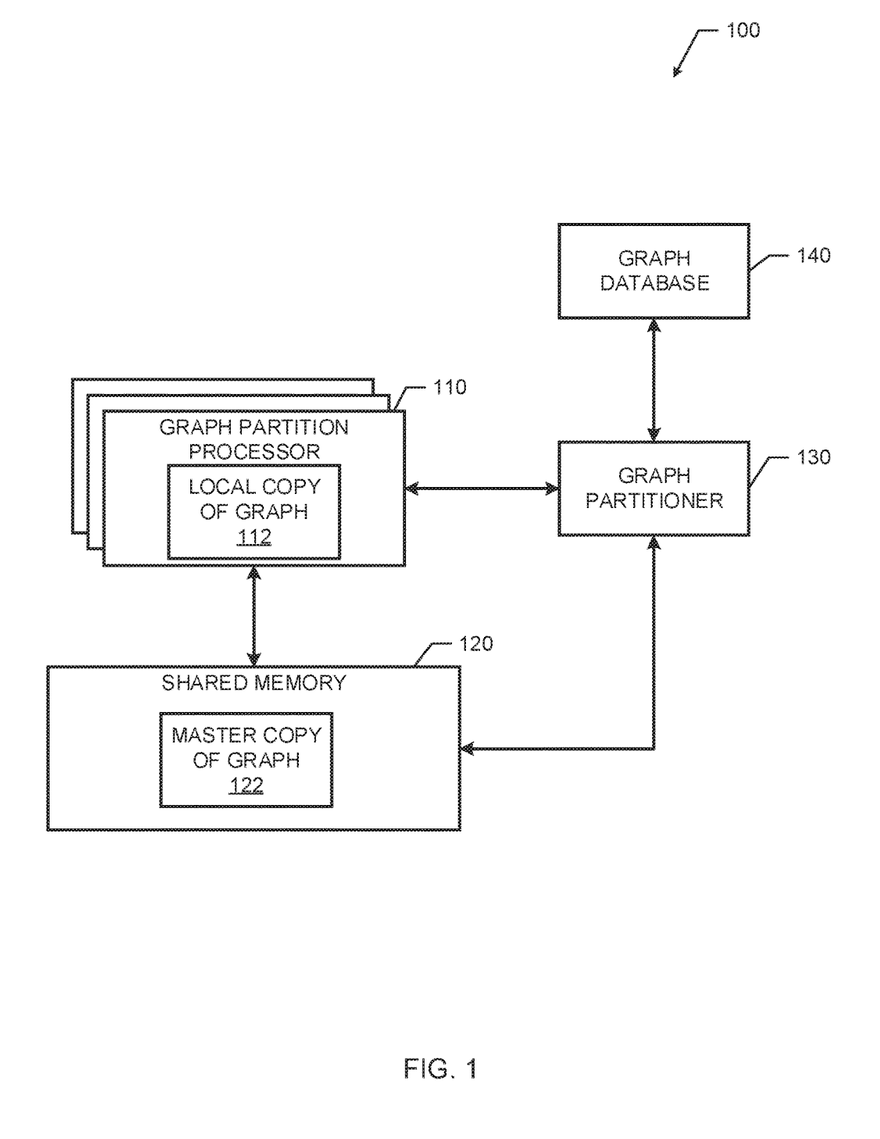
FIG. 1 illustrates a schematic diagram of an example graph processing system including example graph partition processors implemented in accordance with an aspect of this disclosure.

FIG. 1 is a schematic diagram of an example graph processing system 100 including example graph partition processors 110 constructed in accordance with examples herein. The example graph processing system 100 of FIG. 1 includes a plurality of the graph partition processors 110, a shared memory 120, a graph partitioner 130, and a graph database 140. In examples herein, the graph partitioner 130 partitions a graph from the graph database 140 to the graph partition processors 110, which process the respective graph partitions using local copies 112 of a state of the graph and a master copy 122 of a state of the graph in the shared memory 130.

The example graph partition processors 110 are standalone processing units of a multi-core environment. Accordingly, the example graph partition processors 110 may operate individually from one another via independent operating systems, independent local memories (e.g., dynamic random access memories (DRAM)), etc. As further described below in connection with FIG. 2, the graph partition processors 110 process respective vertices using vertex data and edge data for the respective vertices of the graph partition processors 110 and maintain local copies 112 of vertex states of a graph (which may be referred to herein as "local copies" for purposes of readability) that is being processed by the graph partition processors 110. Using the local copies 112 of the vertex states of the graph and a master copy 122 of the vertex states of the graph (which may be referred to herein as a "master copy" for purposes of readability) in the shared memory 120, the graph partition processors 110 may independently iteratively update their respective vertex states following processing of their respective vertices. The example local copies 112 of the vertex states of the graph may be stored in respective DRAMs of the graph partition processors 110

The example graph database 140 stores graph data for graphs. The example graph database 140 may be implemented by at least a storage device, a computing device, a network device, etc. that may store or provide graph data for graphs that are to be processed in accordance with examples herein. The example graph partitioner 130 may receive/retrieve graph data for graphs from the graph database 140. The graph partitioner 130 assigns partitions of the graph data to the graph partition processors 110.

In examples herein, the graph partitioner 130 partitions a graph from the graph database 140 such that vertex data for vertices of the graph is distributed across different graph partition processors 110. Accordingly, vertex data for a same vertex may not be located in or processed by more than one of the graph partition processors 110. Furthermore, edge data (and/or metadata) corresponding to the edges linked to the vertices of the vertex data is provided to the corresponding graph partition processor 110. Thus for example, if vertex data for a first set of vertices is distributed to a first graph partition processor of the plurality of graph partition processors 110, edge data corresponding to the edges linked to the first set of vertices is also stored in the first graph partition processor. Accordingly, vertex data cannot be replicated or duplicated across a plurality of the graph partition processors 110 so that only a single one of the graph partition processors 110 can update each vertex of a graph processed by the graph processing system 100.

The example graph partitioner 130 may distribute the graph to the graph partition processors 110 based on local memories of the graph partition processors 110. For example, the graph partitioner 130 may determine a capacity of the local memories of the graph partition processors 130 and determine a number of graph partition processors 110 to be used in processing a graph based on the capacities of the local memories and the size of the graph. Accordingly, the number of the graph partition processors 110 used in processing a graph may be based on the capacity of the local memories of the graph partition processors 110.

The example shared memory 120 of FIG. 1 stores a master copy 122 of a vertex state of a graph. The example shared memory may be implemented by a non-volatile memory, such as a memristor pool, a phase change memory, a fabric attached memory (e.g., a persistent, byte-addressable memory accessible via a memory fabric), or any other type of large non-volatile memory pool. In examples herein, the master copy 122 of the state of the graph is updated in response to the graph partition processors 110 processing iterations of the respective vertices. The example master copy 122 of the vertex state of the graph may further be used to update the local copies 112 of the vertex state of the graphs in the graph partition processors 110. Accordingly, each local copy 112 of the vertex state of the graph in the graph partition processors 110 can be updated when one or a plurality of the graph partition processors processes their respective vertices and updates the master copy 122 of the vertex state of the graph, accordingly. In examples herein, the local copies 112 of the vertex state of the graph may not always be entirely accurate because the master copy 122 may be updated by one of the graph partition processors 110 before the master copy 122 is provided to the other graph partition processors 110. However, the master copy 122 of the vertex state of the graph is updated (periodically or aperiodically) by all of the graph partition processors 110 after processing of the local vertices. Accordingly, eventually, the local copies of the vertex state of the graph 112 are updated for use in processing the respective vertices of the graph partition processors 110, at which point subsequent iterations of the respective vertices of the graph partition processor 110 can be performed based on the respective updated local copy 112.

In examples herein, convergence of a graph processed by the graph processing system 100 may be reached when the master copy 122 of the vertex state of the graph 122 does not change state following iterations of the graph processing system 100 or iterations of the graph partition processors 110. In some examples, the local copies 112 of the vertex state of the graph and the master copy of the state of the graph 122 may only store vertex data indicating the vertex states of the vertices of the graph and not store any corresponding edge data.

Figure 2:
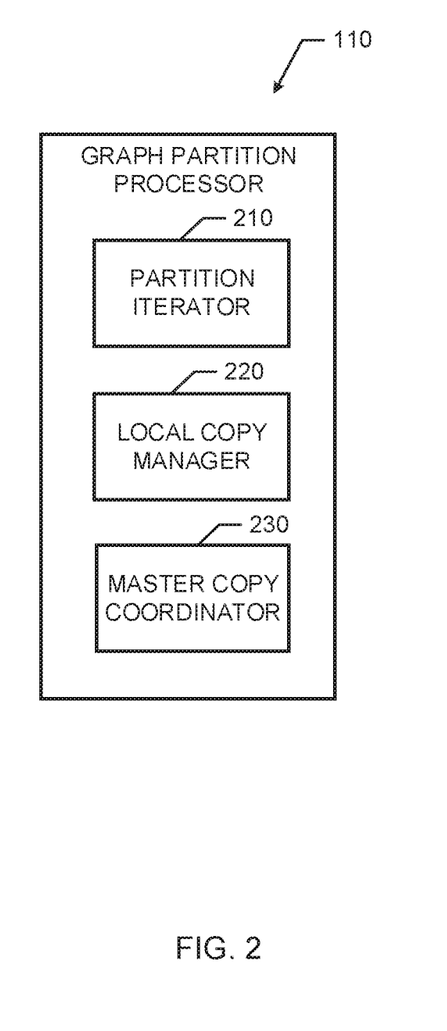
FIG. 2 is a block diagram of an example graph partition processor that may be used to implement the example graph partition processors of FIG. 1.

FIG. 2 is a block diagram of an example implementation of a graph partition processor 110, which may be used to implement the graph partition processors 110 of FIG. 1. The example graph partition processor 110 of FIG. 2 includes a partition iterator 210, a local copy manager 220, and a master copy coordinator 230. In examples herein, the partition iterator 210 processes vertices of the partition of the graph partition processor 110, the local copy manager 220 manages lock-free updates to the local copy 112 of the vertex state of the graph, and the master copy coordinator 230 provides updates (e.g., pushes) of the vertices by the partition iterator 110 to the master copy 122 in the shared memory 120 and retrieves (e.g., pulls) updated states of other vertices from other graph partitioning processors 110 from the master copy 122 of the state of the graph.

The example partition iterator 210 of FIG. 2 iteratively performs lock-free processing of graph data for vertices distributed to the graph partition processor 110 by the graph partitioner 130. For example, for each iteration, the partition iterator 210 may process (perform belief propagation, Gibbs sampling, etc.) vertex data using metadata (e.g., connected vertices, edge data) associated with the vertices and states of the vertices of the graph indicated in the local copy 112 of the state of the graph using a lock-free mechanism. The partition iterator 210 processing is lock-free in that can process vertices of the partition assigned to the graph partition processor 110 without blocking readers for the completion of write operations to the local copy 112 of the vertex state of the graph. Accordingly, the example partition iterator 210 may compute states of the respective vertices of the graph partition processor 110. In examples herein, the partition iterator 210 may process vertices of the graph partition processor 110 until convergence of the vertices is met. Further, the graph partition iterator 210 may iteratively process the vertices of the graph partition processor 110 after each update to the local copy 112 of the vertex state of the graph. Accordingly, each of the local copies 112 of the vertex state of the graph is updated by the local copy manager 220 (e.g., in response to receiving a copy of the master copy 122), the partition iterator 210 processes the vertices of the graph partition processor 110 of FIG. 2. Therefore, the local copy manager may update the local copy 112 based on local processing of the vertices of the partitions by the partition iterator 210 and based on replicas of the vertex states from other graph partition processors via the master copy 122.

The example local copy manager 220 manages the local copy 112 of the vertex state of the graph in a local memory (e.g., a DRAM) of the graph partition processor 110. In examples herein, the local copy manager 220 may update states of the vertices after each iteration by the partition iterator 110 to process the vertices of the graph partition processor 110. Furthermore, the local copy manager 220 may update other states of vertices processed by other graph partition processors based on vertex state information from the master copy 122 that is retrieved by the master copy coordinator 230. For example, the master copy coordinator 230 may retrieve (e.g., read) a copy of the master copy 122 such that the local copy manager 220 may update the states of the vertices of the graph that are not processed by the graph partition processor 110. In some examples, the local copy manager 220 may detect convergence of the graph when the master copy 122 of the state of the graph matches (or is the same as) the local copy 112 of the state of the graph for the graph partition processor 110 of FIG. 2.

The example master copy coordinator 230 coordinates with the master copy 122 of the graph in the shared memory 120. In examples herein, the master copy coordinator 230 provides (e.g., pushes) updates to the vertices processed by the partition iterator 210 to the master copy 122 in the shared memory 120. For example, the master copy coordinator 230 may write (e.g., push) the updates to the vertices of the local copy 112 to the master copy 122. In some examples, the master copy coordinator 230 may pull the master copy 122 from the shared memory 120. Accordingly, when other graph partition processors 110 update the master copy (or it is updated in response to updates from other graph partition processors), the master copy coordinator 230 may read the master copy 122 and provide the copy and/or updates to the master copy 122 of the state of the graph to the local copy manager 220 to make the corresponding updates to the local copy 112 of the state of the graph. As such, when the partition iterator 210 performs subsequent lock-free iterations, the partition iterator 210 has the most recent copy of the state of the graph based on the master copy 122.

In examples herein, the master copy coordinator 230 may use a batch size parameter to determine when to push updates to the master copy 122 in the shared memory 120. The example batch size parameter may be set such that the local copy 112 is pushed to the master copy 122 more frequently, less frequently, or iteratively relative to the lock-free iterations performed by the partition iterator 210 on the local copy 112. The example batch size may be a fraction of the updated vertices in the local copy 112 to execute the push to the master copy 122.

While an example manner of implementing the graph partition processor of FIG. 1 is illustrated in FIG. 2, at least one of the elements, processes and/or devices illustrated in FIGS. 1 and/or 2 may be combined, divided, re-arranged, omitted, eliminated and/or implemented in any other way. Further, the partition iterator 210, the local copy manager 220, the master copy coordinator 230, and/or, more generally, the example graph partition processor 110 of FIG. 2 may be implemented by hardware and/or any combination of hardware and executable instructions (e.g., software and/or firmware). Thus, for example, any of the partition iterator 210, the local copy manager 220, the master copy coordinator 230, and/or, more generally, the example graph partition processor 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the partition iterator 210, the local copy manager 220, and/or the master copy coordinator 230 is/are hereby expressly defined to include a tangible machine readable storage device or storage disk such as a memory, a digital versatile disk (DVD), a compact disk (CD), a Blu-ray disk, etc. storing the executable instructions. Further still, the example graph partition processor 110 of FIG. 2 may include at least one element, process, and/or device in addition to, or instead of, those illustrated in FIG. 2, and/or may include more than one of any or all of the illustrated elements, processes and devices.

Figure 3:
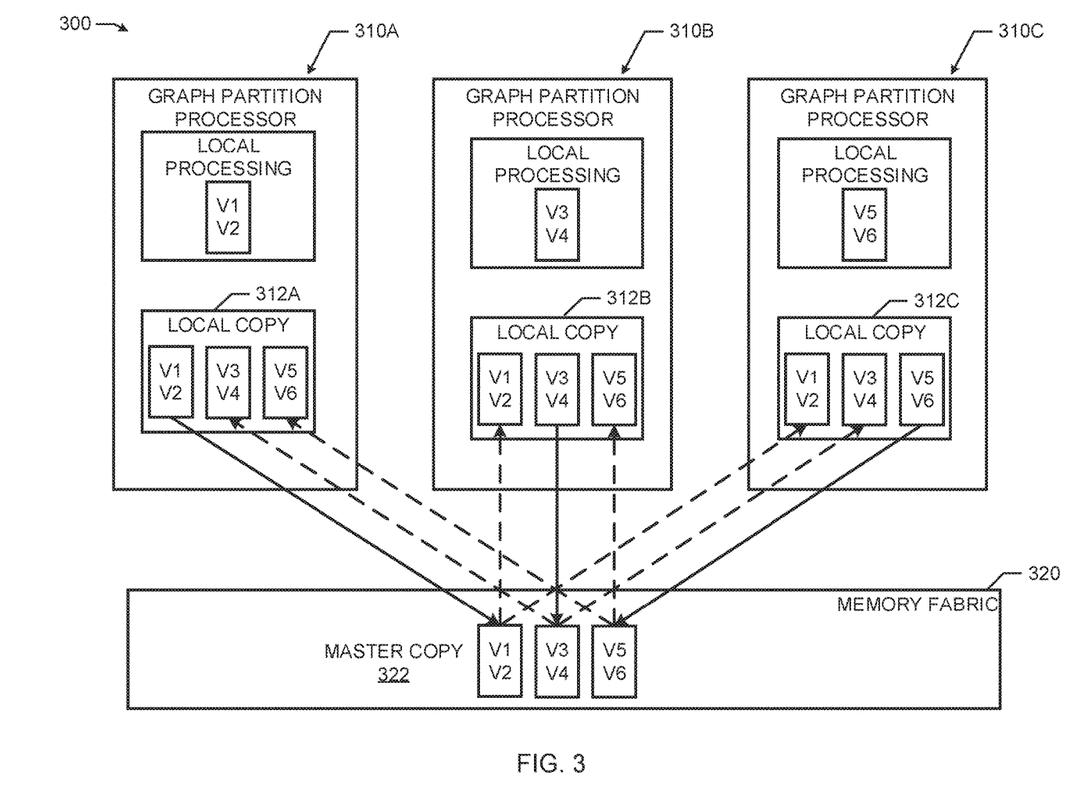
FIG. 3 illustrates an example distribution of a graph and locations of copies of vertex states of a graph in the example iterative graph processing system of FIG. 1 using the graph partition processors of FIG. 2.

FIG. 3 illustrates an example distribution (or partition) of a graph and locations of copies of the states of the graph in an example graph processing system 300 using graph partition processors 310A, 310B, 310, which may be implemented by the graph partition processors 110 of FIG. 1 and/or the graph partition processor 110 of FIG. 2. In the illustrated example of FIG. 3, a graph having six vertices, V1, V2, V3, V4, V5, V6 is distributed to the three the graph partition processors 310A, 310B, 310C. As illustrated in FIG. 3, the first graph partition processor 310A processes a first pair of vertices V1, V2, the second graph partition processor 310E processes a second pair of vertices V3, V4, and the $3^{rd}$ graph partition processor 310C processes a third pair of vertices V5, V6. Each of the graph partition processors 310A, 310B, 310C stores a local copy 312A, 312B, 312C of a state of the graph in a local memory (e.g., in a DRAM of each of the graph partition processors 310A, 310B, 310C). And finally, a master copy of a state of the graph is stored in a shared memory 320, which may be implemented by the shared memory 120 of FIG. 1.

As shown, in the illustrated example of FIG. 3, each of the graph partition processors 310A-310C are responsible for processing the respective vertices V1-V6. For example, the first graph partition processor 310A processes the first pair of vertices V1, V2, the results of which may be reflected in the local copy 312A. The first graph partition processor 310A may then provide (represented by solid arrow) an updated state of the first pair of vertices V1, V2 to the master copy. Meanwhile, the second and third graph partition processors 310B, 310C may provide (represented by solid arrows) updates corresponding to the second and third pair of vertices V3, V4 and V5, V6, respectively to the master copy. The graph partition processors 310A-310C may then retrieve (represented by respective dashed arrows) the updated states of the vertices V1-V6 from the master copy 322 in the shared memory 320. It is noted, that the write and read operations represented by the solid arrows (writes) and dashed arrows (reads) between the graph partition processors 310A-310C and the memory fabric 320 may occur in any order or substantially simultaneously. Accordingly, the graph with vertices V1-V6 may be processed in the graph processing system 300 of FIG. 3 without having to lock any of the processing or iterations of the graph partition processors 310A-310C.

Figure 4:
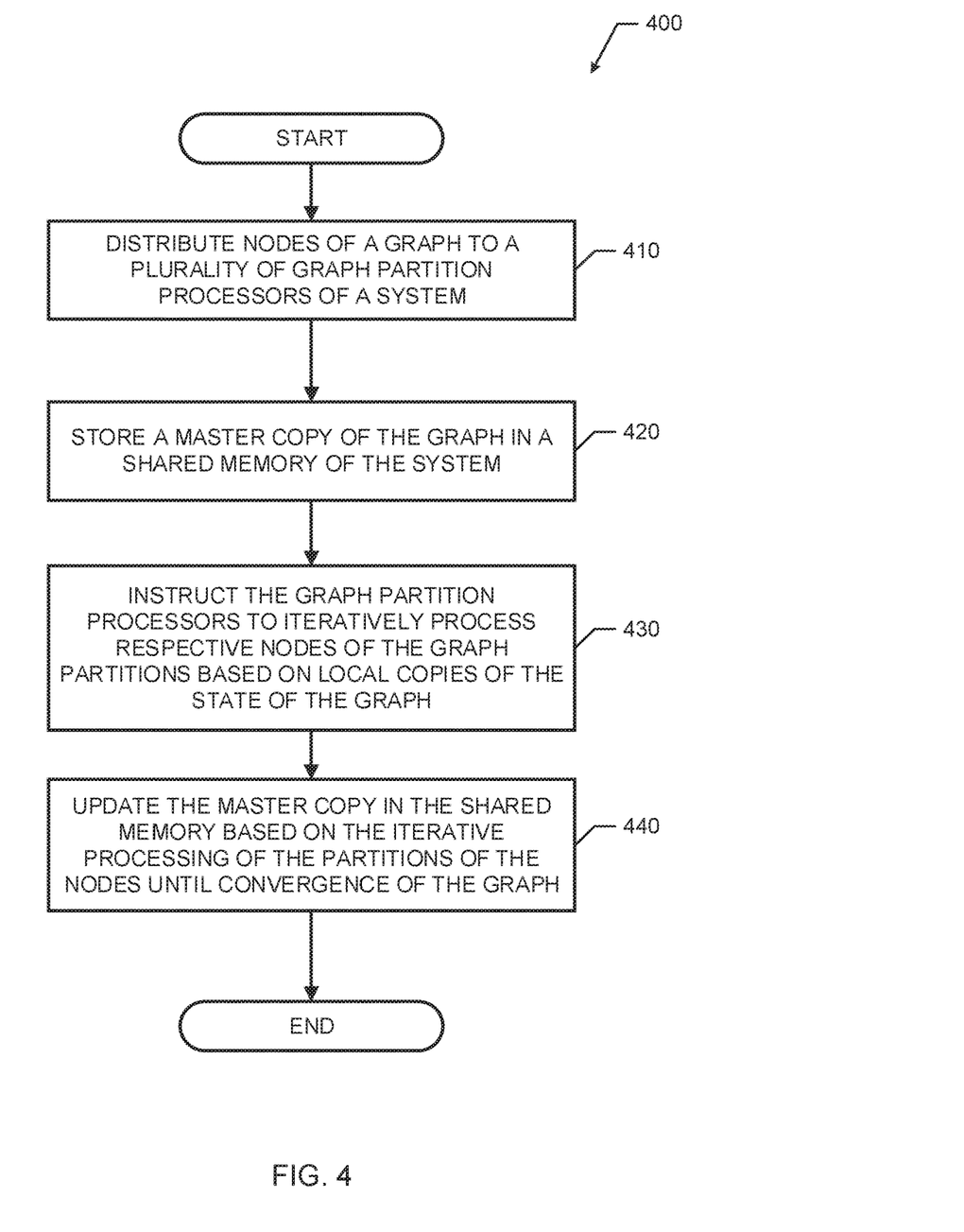
FIG. 4 is a flowchart representative of example machine readable instructions that may be executed to implement the graph processing system of FIG. 1.

A flowchart representative of example machine readable instructions for implementing the graph processing system 100 of FIG. 1 is shown in FIG. 4. In this example, the machine readable instructions comprise a program/process for execution by a processor such as the processor 612 shown in the example processor platform 600 discussed below in connection with FIG. 6. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 612, but the entire program/process and/or parts thereof could alternatively be executed by a device other than the processor 612 and/or embodied in firmware or dedicated hardware. Further, although the example program is described with reference to the flowchart illustrated in FIG. 4, many other methods of implementing the example graph processing system 100 may alternatively be used. For example, the order of execution of the blocks may be changed, and/or some of the blocks described may be changed, eliminated, or combined.

The example process 400 of FIG. 4 begins with an initiation of the graph processing system 100 (e.g., upon startup, upon instructions from a user, etc.). The example process 400 of FIG. 4 may be executed to asynchronously process a graph using a plurality of processors (e.g., the graph partition processors 110) of a multi-core environment and a shared memory (e.g., the memory 120). At block 410, the graph partitioner 130 distributes vertices of a graph to a plurality of graph partition processors 110 of the system 100. At block 420, the graph partitioner 130 stores a master copy of the graph in the shared memory 420.

At block 430, the system 100 instructs the graph partition processors 110 (e.g., in response to a user instruction, in response to an initiation of the system, etc.) to iteratively perform lock-free processing of respective vertices of the graph partitions based on local copies of the state of the graph in local memories of the graph partition processors. At block 440, the graph partition processors 110 update the master copy in the shared memory based on the iterative processing of the partitions of the vertices until convergence of the graph. After block 440, the example process ends.

Figure 5:
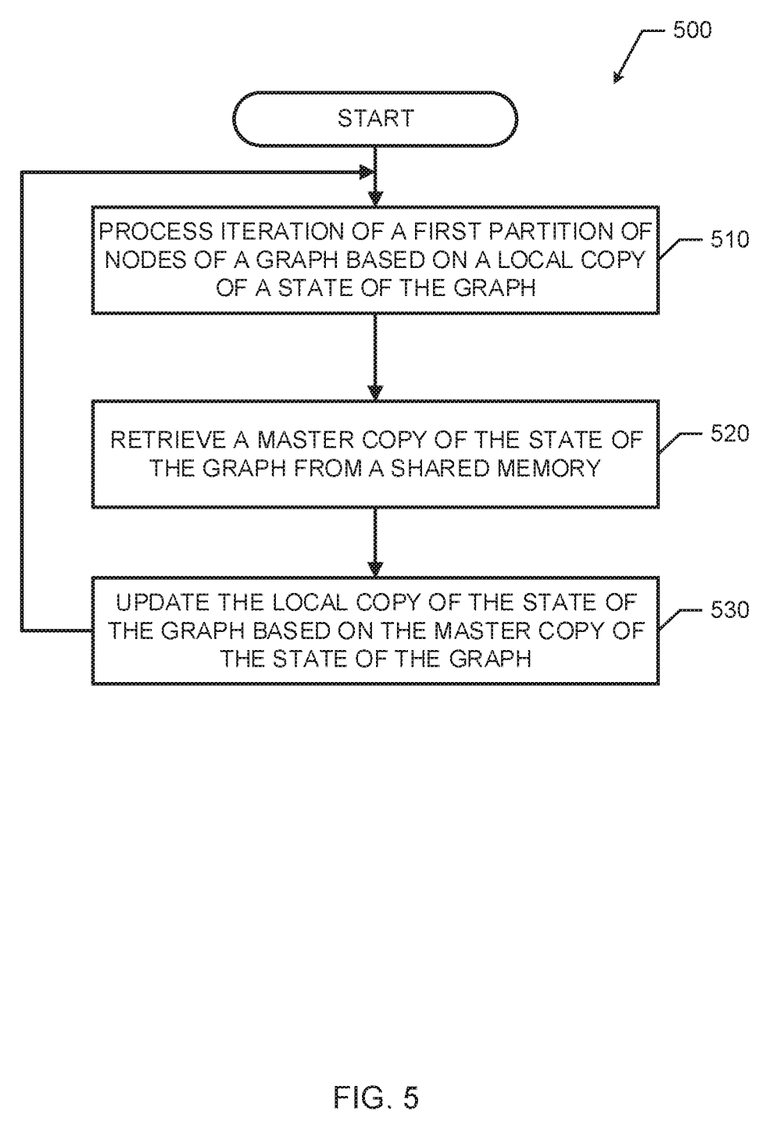
FIG. 5 is a flowchart representative of example machine readable instructions that may be executed to implement the graph partition processor of FIG. 2.

A flowchart representative of example machine readable instructions for implementing the graph partition processor 110 of FIG. 2 is shown in FIG. 5. In this example, the machine readable instructions comprise a program/process for execution by a processor such as the processor 612 shown in the example processor platform 600 discussed below in connection with FIG. 6. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 612, but the entire program/process and/or parts thereof could alternatively be executed by a device other than the processor 612 and/or embodied in firmware or dedicated hardware. Further, although the example program is described with reference to the flowchart illustrated in FIG. 5, many other methods of implementing the example graph partition processor 110 may alternatively be used. For example, the order of execution of the blocks may be changed, and/or some of the blocks described may be changed, eliminated, or combined.

The example process 500 of FIG. 5 begins with an initiation of the graph partition processor 110 (e.g., upon startup, upon instructions from a user, upon startup of a system implementing the graph partition processor 110 (e.g., the graph processing system 100), etc.). The example process 500 of FIG. 5 may be executed to process a partition of a graph using local copies of the graph and a master copy of the graph in a shared memory that it is updated by other graph partition processors. At block 510, the partition iterator 210 processes an iteration of a vertices of a first partition of a graph based on the local copy 112 of the state of the graph. At block 520, the master copy coordinator 230 retrieves (e.g., reads) a copy of the state of the graph from the shared memory. At block 530, the local copy manager 220 updates the local copy of the state of the graph based on the master copy of the state of the graph. After block 530, control returns to block 510 for a subsequent iteration.

In some examples, the example process 500 may end after block 530 if there are no differences between the master copy of the state of the graph and the local copy of the state of the graph. In such examples, the processing of the graph may have converged and processing is complete.

As mentioned above, the example processes of FIGS. 4 and/or 5 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 6:
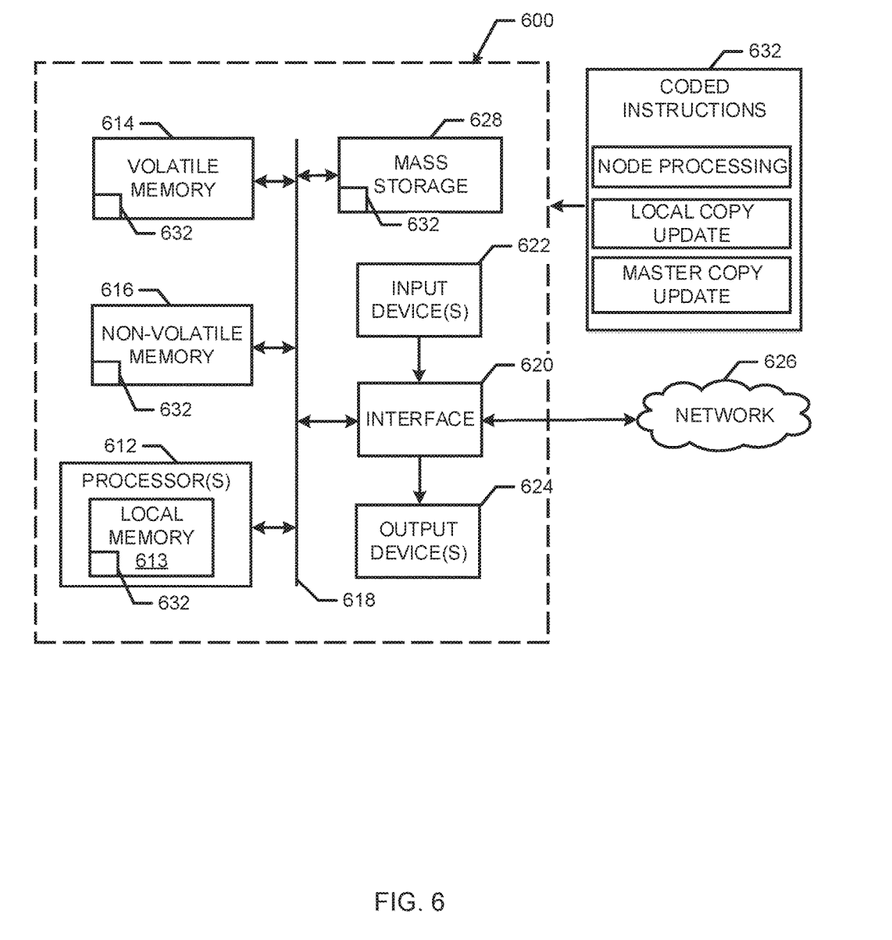
FIG. 6 is a block diagram of an example processor platform capable of executing the instructions of FIGS. 1 and/or 2 to implement the iterative graph processing system of FIG. 1 and/or the graph partition processor of FIG. 2, respectively.

FIG. 6 is a block diagram of an example processor platform 600 capable of executing the instructions of FIGS. 4 and/or 5 to implement the graph processing system 100 of FIG. 1 and/or the graph partition processor 110 of FIG. 2, respectively. The example processor platform 600 may be or may be included in any type of apparatus, such as a server, a personal computer, any other type of computing device.

The processor platform 600 of the illustrated example of FIG. 6 includes a processor 612. The processor 612 of the illustrated example is hardware. For example, the processor 612 can be implemented by at least one integrated circuit, logic circuit, microprocessor or controller from any desired family or manufacturer.

The processor(s) 612 of the illustrated example includes a local memory 613 (e.g., a cache, a DRAM, etc.). The processor(s) 612 (which may be used to implement the example graph partition processors 110) of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 (which may be used to implement the shared memory 120) may be implemented by flash memory, a persistent, byte-addressable memory accessible via a memory fabric and/or any other desired type of non-volatile memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, at least one input device 622 is connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 624 is also connected to the interface circuit 620 of the illustrated example. The output device(s) 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, may include a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, eta).

The processor platform 600 of the illustrated example also includes at least one mass storage device 628 for storing executable instructions (e.g., software) and/or data. Examples of such mass storage device(s) 628 include floppy disk drives, hard drive disks, compact disk drives, Blu-ray disk drives, RAID systems, and digital versatile disk (DVD) drives.

The coded instructions 632 of FIGS. 4 and/or 5 may be stored in the mass storage device 628, in the local memory 613 in the volatile memory 614, in the non-volatile memory 616, and/or on a removable tangible machine readable storage medium such as a CD or DVD.

From the foregoing, it will be appreciated that the above disclosed methods, apparatus and articles of manufacture provide a graph processing system in which vertices of a graph are distributed and non-overlapped to a plurality of independent processing units (e.g., the graph partition processors 110) that utilize a local copy of a state of the graph and a master copy of the state of the graph (e.g., the states in the local and master copies may include any/all mutable elements of the graph) in a shared memory to process the graph. Examples herein allow for lock-free processing of a graph to increase processing speed and efficiency. Using the states of the vertices and metadata corresponding to the vertices of each processing unit, the multiple processing units can independently process their respective vertices based on the local copies of the state of the graph which is updated (periodically or aperiodically) based on a retrieval (e.g., a read) of the master copy in the shared memory.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
distributing vertices of a graph to a plurality of graph partition processors of a system, the graph partition processors to process non-overlapping sets of vertices of the graph;
storing a master copy of a state of the graph in a shared memory of the system;
instructing the graph partition processors to iteratively perform lock-free processing of respective vertices of the graph partitions based on local copies of the state of the graph stored in respective local memories of the graph partition processors; and
updating the master copy of the state of the graph in the shared memory based on the iterative processing of the partitions of the vertices by the graph partition processors until convergence of the graph; and
wherein distributing the vertices of the graph is based on a capacity of the local memories of the graph partition processors.

2. The method of claim 1, further comprising:
updating the local copies of the state of the graph in the local memories of the graph partition processors based on the master copy of the state of the graph based on a batch size of the vertices of the partition.

3. The method of claim 2, further comprising updating the local copies of the state of the graph of one of the graph partition processors after the master copy of the state of the graph is updated based on the iterative lock-free processing of the vertices of the partition of the one of the graph partition processors.

4. The method as defined in claim 1, further comprising:
determining that convergence of the graph has been reached in response to the master copy of the graph not changing after all graph partition processors have provided updates to vertex states of the respective partitions.

5. A system comprising:
a shared memory comprising a master copy of a state of a graph; and a plurality of graph partition processors in communication with the shared memory, each of the plurality of graph partition processors, to process non-overlapping partitions of the graph, to:
  perform lock-free iterations of vertices of a partition of the graph based on metadata corresponding to the vertices of the partition of the graph and a local copy of the state of the graph, the local copy of the state of the graph stored in a local memory;
  update the local copy of the state of the graph in the local memory based on the iterations of the partition iterator and updates to the master copy of the state of the graph;
  update the vertices of the partition the graph in the master copy of the vertex state of the graph and retrieve updates to other partitions of the graph from the master copy of the state of the graph in the shared memory; and
  wherein the retrieved updates to other partitions of the graph from the master copy of the state of the graph are stored in the local memory for a subsequent iteration of processing the vertices of the partition of the graph partition processor.

6. The system of claim 5, wherein the shared memory comprises a persistent, byte addressable memory accessible via a memory fabric.

7. The system of claim 5, wherein the graph partition processors comprise independent processing units of a multi-core environment.

8. The system of claim 5, wherein the number of the plurality of graph partition processors is based on the capacity of the local memories of the graph partition processors.

9. A non-transitory machine readable medium comprising instructions that, when executed, cause a machine to at least:
  process a first iteration of vertices of a first partition of a graph based on a local copy of a state of the graph, the local copy of the state of the graph stored in a local memory of a processor to process the first iteration;
  retrieve a master copy of the state of the graph from a shared memory fabric in communication with the processor;
  process a second iteration of the vertices of the first partition after the local copy of the state of the graph is updated based on the master copy of the state of the graph; and
  update the local copy of the state of the graph based on the master copy of the state of the graph, the updated local copy to be used for subsequent iterations of processing the vertices of the first partition of the graph.

10. The non-transitory machine readable medium of claim 9, wherein the instructions when executed, further cause the machine to:
  partition the first partition of the vertices of the graph to a first graph partition processor and partitioning a second partition of the vertices of a graph to a second graph partition processor that is different from the first graph partition processor.

11. The non-transitory machine readable medium of claim 9, wherein the instructions, when executed, further cause the machine to:
  updating the master copy of the state of the graph with updates to the vertices of the first partition based on the first iterations.

12. The non-transitory machine readable medium of claim 9, wherein the master copy of the state of the graph indicates an update to second vertices of a second partition of the graph.

* * * * *